United States Patent [19]
Flotow et al.

[11] 4,269,296
[45] May 26, 1981

[54] TWO-STAGE COAXIAL SPRING DAMPER

[76] Inventors: Richard A. Flotow, 904 Elmrow Dr., Fort Wayne, Ind. 46806; William H. Sink, P.O. Box 465, Auburn, Ind. 46707

[21] Appl. No.: 52,898

[22] Filed: Jun. 27, 1979

[51] Int. Cl.³ .............................................. F16D 3/66
[52] U.S. Cl. ................... 192/106.2; 64/27 C
[58] Field of Search .......................... 192/106.1, 106.2; 64/27 C

[56] References Cited

U.S. PATENT DOCUMENTS

| | | |
|---|---|---|
| 2,221,800 | 11/1940 | Johnson . |
| 2,920,733 | 1/1960 | Lysett .................. 192/106.2 |
| 3,138,011 | 6/1964 | Stromberg . |
| 3,138,039 | 6/1964 | Zeidler et al. . |
| 3,380,566 | 4/1968 | Cook .................. 192/106.2 |
| 3,386,265 | 6/1968 | Kasaback . |
| 4,144,959 | 3/1979 | Maucher et al. .......... 192/106.2 |

FOREIGN PATENT DOCUMENTS

| | | | |
|---|---|---|---|
| 2303638 | 8/1973 | Fed. Rep. of Germany ........ 192/106.2 |
| 1328276 | 4/1963 | France ................. 192/106.2 |

Primary Examiner—George H. Krizmanich
Attorney, Agent, or Firm—Robert M. Leonardi; Norb A. Heban

[57] ABSTRACT

A clutch driven disc assembly is disclosed having coaxial damper springs between rotary elements of the disc assembly. Each element has spring receiving openings with the end walls which permit the springs to operate in two stages, thereby varying the deflection rate between the rotary elements.

7 Claims, 10 Drawing Figures

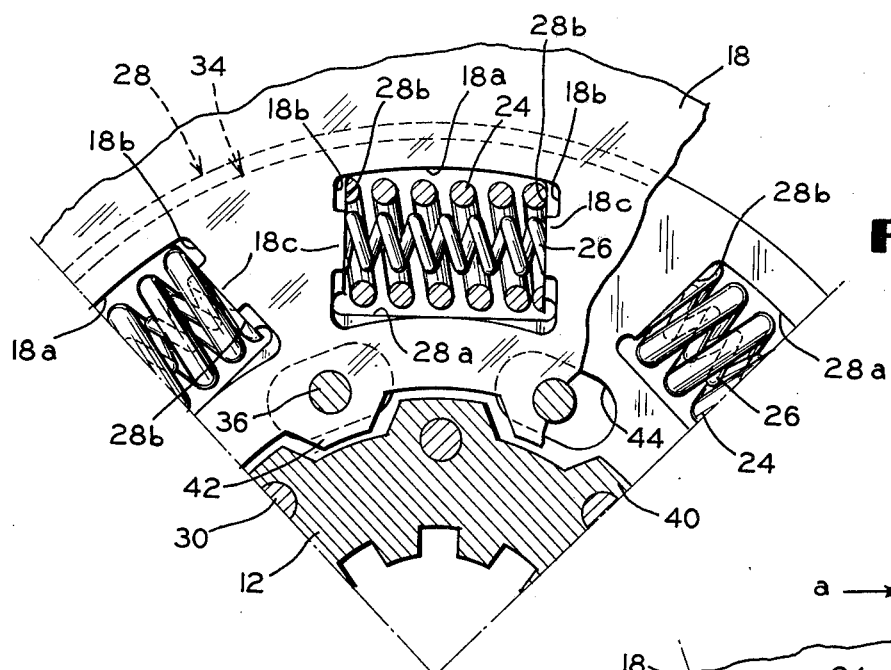
FIG. 7
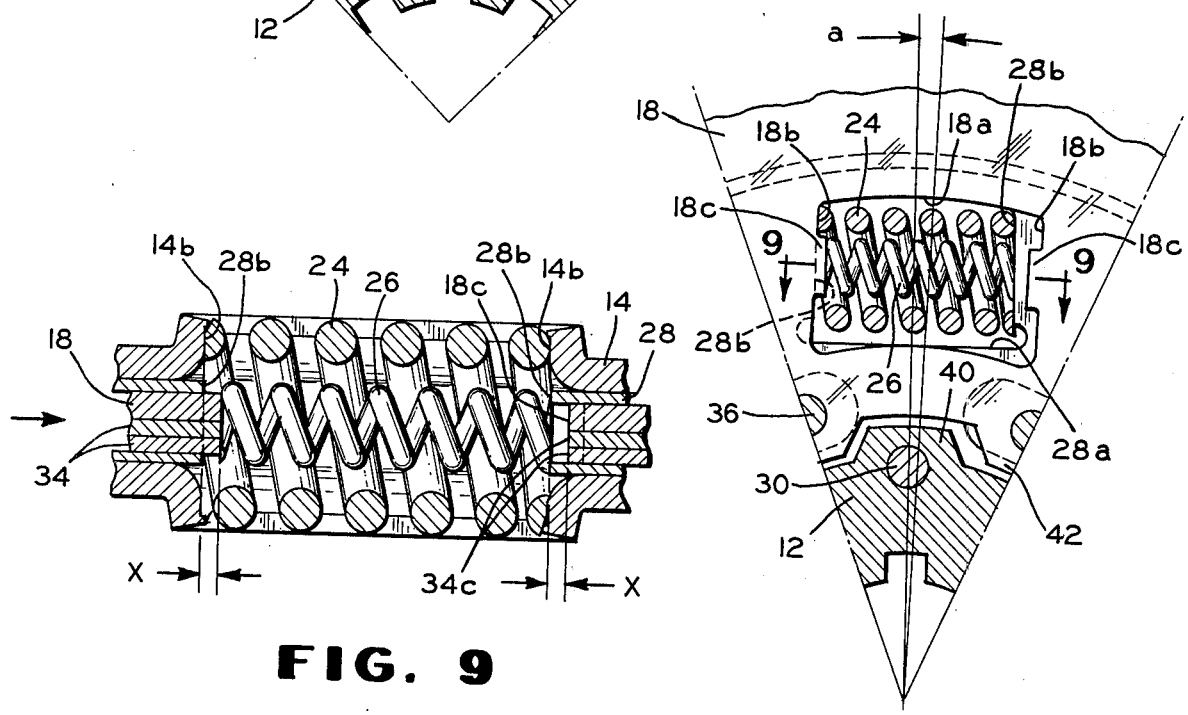
FIG. 9
FIG. 8
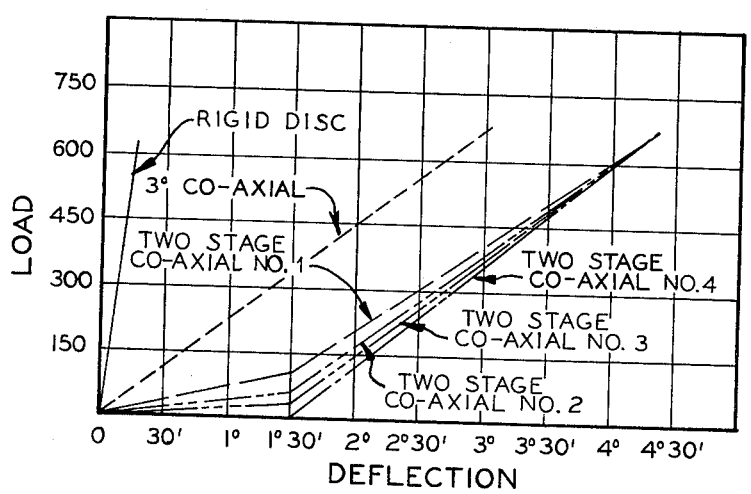
FIG. 10

TWO-STAGE COAXIAL SPRING DAMPER

BACKGROUND OF THE INVENTION

This invention relates to rotary torque transmitting devices in general and is particularly directed to an improved damper arrangement for these devices.

In conventional passenger cars and trucks, objectionable driveline vibrations may occur at certain speeds and load conditions. Some of these disturbances may be eliminated or reduced to an acceptable level with the incorporation of a torsional damper in the driven disc portion of the vehicle clutch. Damping is normally provided by a plurality of circumferentially spaced coiled springs operatively connected between relatively rotatable elements of the clutch driven disc assembly.

Clutches with dampers are widely used in all types of power transmissions systems. In certain applications, it has been found advantageous to have a damper arrangement which permits varying rates of deflection between the rotary elements. The purpose of this type of arrangement is to have a damper function in a first torsional range to produce a low deflection rate for overcoming minor vibrations, chatter and the like, and in a succeeding torsional range to produce a high deflection rate for accommodating peak shock loads and for high torque load transmission.

Known devices have achieved two-stage damping by providing heavy and light springs which act in series and by coaxially arranging springs which operate in parallel. In the first instance, it is necessary to reconstruct the spring openings of conventional rotary elements to accommodate the added length of a second spring or to reduce the axial length of both springs in order to fit conventional openings.

To function properly, the latter coaxial spring design has required either considerable structural modifications in the mating spring openings of the relatively rotatable elements or, when conventional openings are used, springs of differing lengths. Neither is entirely satisfactory from a structural or cost standpoint.

Thus, while the two-stage concept is not new, the known methods used to accomplish the desired results are not acceptable in heavy duty applications for one reason or another.

It is an object of the present invention to provide a clutch driven disc with an improved two-stage coaxial damper spring arrangement which is simple in design and will not require any additional space to accomplish the desired result.

SUMMARY OF THE INVENTION

The above and other objects are achieved in the present invention by providing modified spring openings in one of the relatively rotatable elements of the clutch. These openings permit the inner springs to operate at light loads and both springs to operate at higher or maximum load conditions.

BRIEF DESCRIPTION OF THE DRAWINGS

FIG. 7 is a partial end elevational view taken substantially along line 7—7 of FIG. 2 showing the position of parts in their inactive state;

FIG. 8 is a view similar to FIG. 7 showing the first stage of operation;

FIG. 9 is an enlarged section view taken along lines 9—9 of FIG. 8; and

FIG. 10 is a graph illustrating a typical torque input verses angular deflection curve for the various types of disc applications.

DESCRIPTION OF A PREFERRED EMBODIMENT

Figure 1:
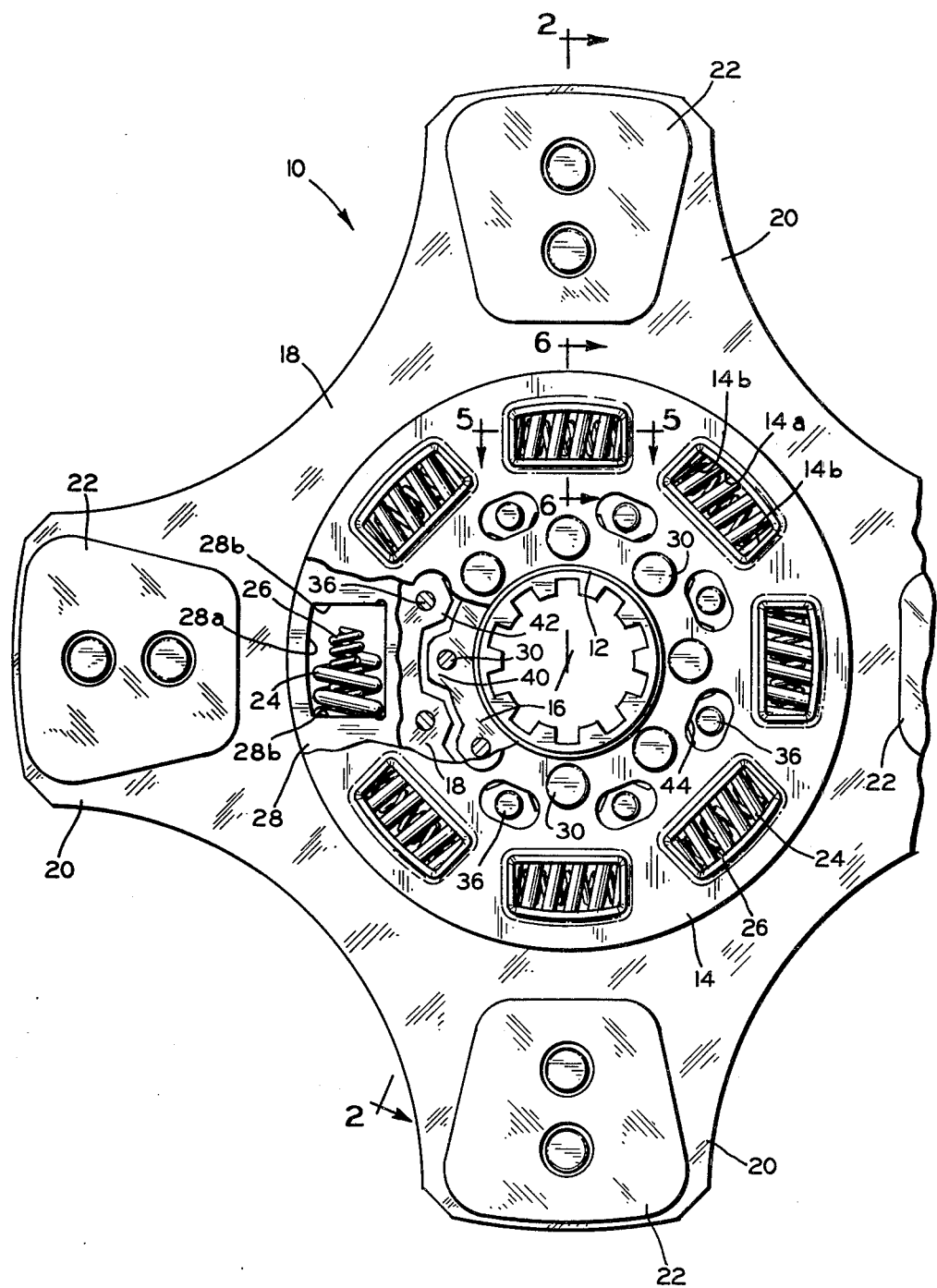
FIG. 1 is a partially broken away end elevational view of a clutch driven disc assembly incorporating the principles of the present invention.
Figure 2:
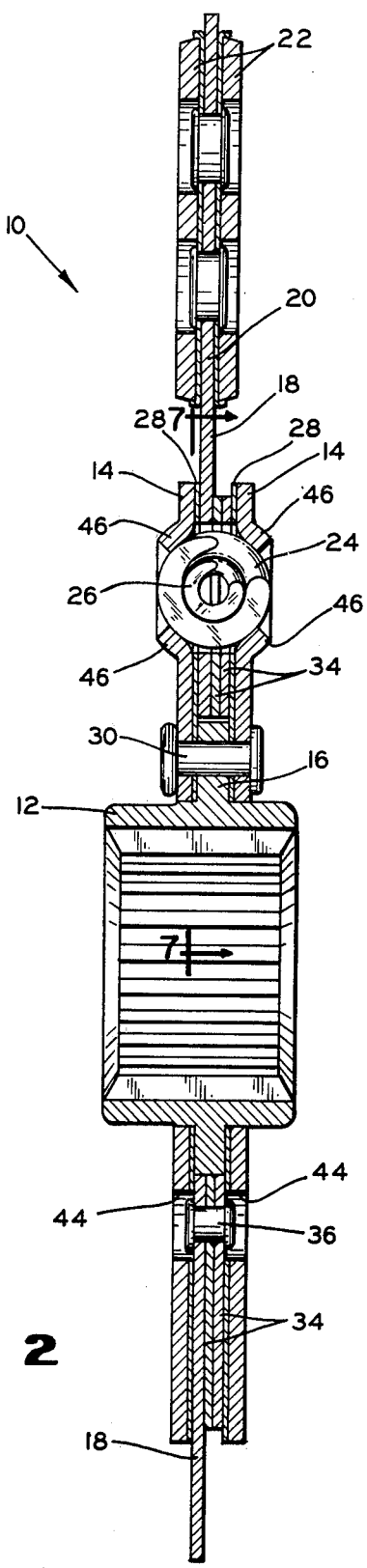
FIG. 2 is a sectional view taken along lines 2—2 of FIG. 1.
Figure 3:
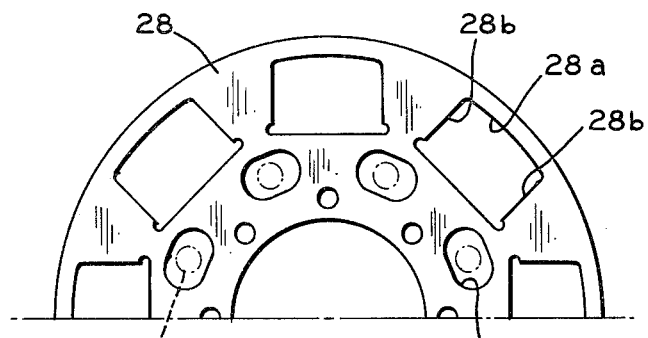
FIG. 3 is a partial end elevational view of one of the covers shown in FIG. 1.
Figure 4:
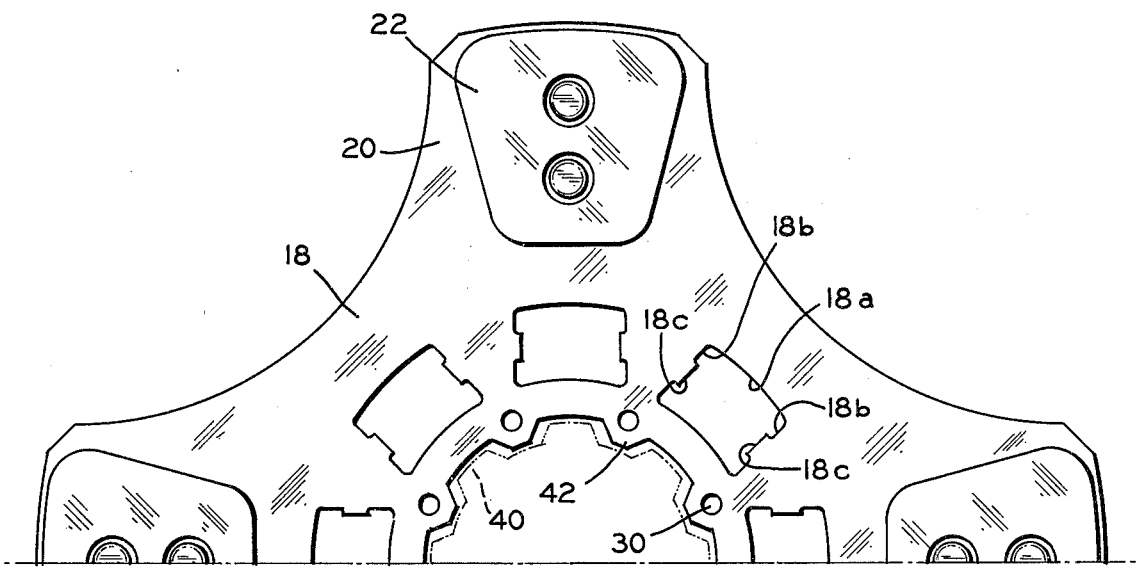
FIG. 4 is a partial end elevational view of one of the friction pad support plates shown in FIG. 1.

Referring to FIGS. 1 and 2 of the drawings, in a preferred embodiment, the rotary torque transmitting device is a dampened drive disc assembly shown at 10. In normal practice, the disc assembly 10 is the driven portion of a clutch which is positioned in a vehicle power line between an engine and a transmission (not shown). The disc assembly 10 comprises rotary torque transmitting elements connected by a damper unit designed to establish a resilient drive between the rotary elements. The damper unit is needed to tune the vehicle drive train system so that critical torsional vibrations are moved out of the operating speed range of the engine and drive train.

In the preferred embodiment, one rotary torque transmitting element of the disc assembly 10 includes a rotatably hub 12 and a pair of spaced outer annular covers 14. An integral radial extending annular flange 16 is formed on the hub 12 with the covers 14 arranged on opposite sides of the flange 16.

The outer rotary element of the disc assembly 10 includes a rotatable disc or support plate 18 having integral radially outwardly extending arms 20. Friction pads 22 are secured to opposite sides of the outermost portions of the arms 20. Plate 18 is located in the axial space provided between outer covers 14.

As is well known, hub 12 is splined to a transmission input shaft (not shown) and the friction pads 22 are positioned between an axially movable clutch pressure plate and an axially stationary engine driven flywheel (not shown). Thus, disc assembly 10 is free to move axially on the transmission input shaft a limited distance but will always rotate with it.

It is essential that the damper unit not only establish the driving connection between the rotary clutch elements, but also absorb the torque of the engine, thereby eliminating chatter and rattle in the vehicle power line. The preferred embodiment includes resilient means comprising a first coil spring 24 and a second coil spring 26 coaxially disposed within the first coil spring 24. The resilient means consists of a plurality of circumferentially spaced spring sets adapted to operate on the same circumferential axis. Covers 14 and 18 and have aligned openings 14a and 18a for receiving and retaining and positioning the coaxial spring sets to transmit a resilient drive between the covers 14 and plate 18. While eight spring sets are shown, any desired number can be used.

In the preferred embodiment, secondary or auxiliary cover members are provided primarily to serve as drive means for the inner springs 26. However, due to their location, the auxiliary cover members also provide additional and improved drive surface area for outer springs 24, as will later be explained in more detail. The secondary or auxiliary cover members comprise a pair of flat annular plates 28 located on opposite sides of the hub flange 16 and inside the outer or main covers 14. Rivets 30 extend through holes in the main and auxiliary covers 14 and 28 and hub flange 16 to secure the parts together as a unitary structure. Auxiliary covers 28 are formed with stamped openings 28a for alignment with main cover openings 14a and support plate openings 18a.

A plurality of flat, annular reinforcing plates 34 are positioned on one side of support plate 18 to substantially fill the axial space between the auxiliary covers 28. A series of rivets 36 securely fasten the reinforcing plates 34 to supporting plate 18 so that they operate as a unit. Openings 34a identical to and aligned with support plate openings 18a are formed in reinforcing plates 34.

From the description thus far, it will be evident that hub 12 and inner and outer covers 14 and 28, respectively, are secured together and will operate as the rotatable driven member of clutch disc assembly 10. The rotatable drive member of the clutch disc assembly 10 consists of support and reinforcing plates 18 and 34 respectively, described above.

In addition to the resilient drive connection provided by coaxial springs 24 and 26, a positive drive connection is also provided between the rotary clutch elements. The resilient drive is effective before the positive drive comes into play. This is accomplished by a lost motion connection which permits the coaxial springs 24 and 26 to function prior to any direct drive being established between the rotary clutch elements. Referring to FIG. 1, the lost motion is achieved through a plurality of outwardly directed teeth 40 on outer periphery hub flange 16 and a plurality of inwardly directed teeth 42 on the interior of support and reinforcing plates 18 and 34. The flange teeth 40 are normally maintained in a position mid-way and equally spaced from contact with the plate teeth 42. The spacing is designed to permit limited relative rotary movement between the hub 12 and plates 18 and 34 during which time the coaxial springs 24 and 26 function in their intended manner, i.e., abosrb or prevent minor transmission of shock loads and torsional vibration in the driveline and establish the initial resilient drive connection between the rotary clutch elements prior to positive drive engagement of teeth 40 and 42.

As seen in FIG. 1, to accommodate the limited rotation that occurs between the hub 12 and plates 18 and 34, circumferentially elongated openings 44 are provided in covers 14 and 28 into which opposed heads of rivets 36 project. The openings 44 permit the necessary clearance for the rivet heads as the coaxial springs 24 and 26 are being compressed to establish the resilient driving connection or to absorb shocks and vibrations in the vehicle drive system.

Referring specifically to the resilient drive connection, the axially aligned openings in the outer and inner covers 14 and 28 and plates 18 and 34 are symmetrically and circumferentially spaced adjacent the hub flange periphery. Outer cover openings 14a, in addition to being similar in shape to inner cover openings 28a, also include short inwardly directed arcuate lips 46 extending toward each other. Lips 46 closely conform to the outer diameter of outer springs 24 and serve to retain the coaxial spring sets within the aligned openings.

Figure 5:
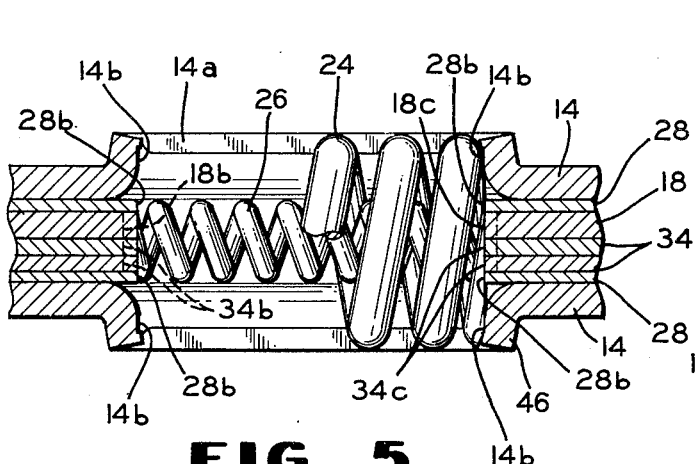
FIG. 5 is an enlarged fragmentary section view taken substantially along line 5—5 of FIG. 1 to more clearly show the resilient drive means and associate parts.

As illustrated best in FIG. 5, both springs 24 and 26 operate on the same axis and are positioned to be driven by thrust receiving surfaces of outer and inner cover opening side walls 14b and 28b, respectively. Because of the cover and spring locations, the circumferentially spaced end walls 14b and 28b of both covers 14 and 28 are in constant with both inner and outer springs 24 and 26. However, due to the reduced diameter of inner spring 26, the spaced end walls 28b of inner cover openings 28a only are in driving contact with the inner spring ends.

A definite advantage exists in providing a secondary cover in a coaxial damper spring arrangement such as disclosed. Not ony does the auxiliary cover provide an ideally located flat drive surface area, i.e., side walls 28b, for the inner spring ends, but it further creates additional driving surface area for the ouer spring ends.

Axial space is of utmost importance and is very limited in heavy duty vehicle clutches. It is difficult to provide greater drive area for the springs merely by increasing the thickness of the main covers because, in most applications, the length of the clutch assembly is specifically defined by the vehicle manufacturer and cannot be easily changed. Because higher loading is being imposed on present damper springs by higher torque rise engines, means other than increased cover thickness must be provided so that increased stresses will not be developed at critical points, i.e., opening end walls and spring ends. This could result in damage to the part and premature clutch failure.

Figure 6:
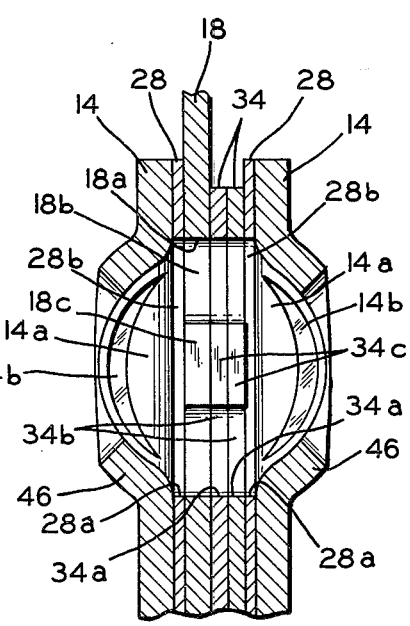
FIG. 6 is an enlarged fragmentary section view taken along line 6—6 of FIG. 1 with the resilient drive means removed.

Further, manufacturing procedures are such that when constructing outer cover openings, it is practically impossible to form a perfectly square or flat end wall for driving contact with the outer spring ends. It is known that the greater drive area provided for the spring ends, the better the load distribution and therefore the greater the torque capacity of the system. The actual thrust receiving surface or drive area presented in this instance is most clearly shown in FIG. 6 and consists of substantially half-moon shaped portions indicated by reference numerals 14b. In the present coaxial spring arrangement, the drive surface area that would be made available for engaging and driving the outer spring ends is not the most satisfactory condition. This condition is improved by putting the thin auxiliary covers 28 inside the main covers 14. In this arrangement, the auxiliary covers 28 are positioned so that the end walls 28b, as seen in FIG. 5, are aligned with the coil portion of the smaller inner spring 26. Thus the plate thickness of the auxiliary covers 26 is constructed and located to intersect the smaller inner spring 26 across substantially the entire diameter of the end coil portions of the springs 26, thereby providing an ideal square engaging surface for the inner spring ends. An additional benefit to this construction is that the engaging and drive surface inner cover opening end walls 28b are located in a position to engage and thereby create a second contact or drive point for the ends of outer springs 24, thereby producing more drive area for the outer springs.

The present invention provides a two-stage operation for coaxially arranged damper springs 24 and 26 in which varied damping characteristics are afforded to meet requirements especially suited for use in vehicles equipped with high torque engines. The requirements are that a soft or weak initial characteristic be built into the clutch for cushioning clutch chatter, shock and vibration, and a hard or stiff rate be present at high loads for accommodating peak shock torques and transmitting high loads.

In the preferred embodiment, means are provided in plate openings 18a and 34a for engaging inner springs 26 to accomplish the desired two-stage operation. The side wall engaging means comprise inwardly directed projections 18c and 34c formed on circumferentially spaced thrust receiving side walls 18b and 34b of plates 18 and 34. Projections 18c and 34c are located midway on side walls 18b and 34b and as a result produce a pair of thrust receiving surfaces on each side wall 18b and 34b which are spaced on opposite radial sides of projections 18c and 34c. Thus projections 18c and 34c extend a short distance inwardly from side walls 18b and 34b thereby defining adjacent cutouts on opposite sides of the projections 18c and 34c. The cutout portions are adapted to be aligned with the coil sections of outer springs 24 but normally spaced a predetermined distance from the springs ends in the neutral or inactive position of the clutch disc 10. The circumferential displacement or spacing of the thrust surfaces on walls 18b and 34b relative to the thrust surfaces on projections 18c and 34c is selected to achieve any desired amount of limited relative rotary movement that is required between the covers 14 and 28 and plates 18 and 34 for the first operating stage.

From the description thus far, it is apparent that plates 18 and 34 provide openings 18a and 34a with side walls 18b and 34b having primary and secondary thrust surfaces designed to achieve the desired two-stage operation. These thrust surfaces, i.e., end walls 18b and 34b and projections 18c and 34c, can easily be altered to vary the load conditions to meet any number of steps or load requirements. For example, alternate or other selected openings in the plates 18 and 34 can be constructed similar to cover openings 28b (without projections 18c and 34c) so that the load verses deflection curve in the disc assembly 10 will change in the first operating stage. Thus, any amount of thrust surfaces can be provided to come up with various degrees or steps in load in the first operating stage. It should also be noted that in any of these adaptations all the springs are still in a slightly prestressed condition within their respective openings. It is also known that the openings must be selected to maintain the disc assembly 10 in a balanced condition.

By way of example and best illustrated in FIGS. 8 and 9, projections 18c and 34c and end walls 18b and 34b are designed so that only inner springs 26 will function as plates 18 and 34 rotate relative to covers 14 and 28 through an angle "a" in opposite directions from the neutral position shown in FIG. 7. The angle "a" is equivalent to 1°30' of relative travel. As plates 18 and 34 move through angle "a", to the right illustrated in FIG. 8, the projections 18c and 34c move a distance "x", relative to covers 14 and 28, to the right in FIG. 9. During this movement inner springs 26 are exercised and will be compressed between thrust surfaces on projections 18c and 34c and opposite thrust surfaces on inner cover openings 28b and outer spring ends move freely into the cutout portions on opposite sides thereof. If additional torque is applied and relative rotary movement exceeds the angle "a" in either direction, the second stage comes into play as the outer springs 24 are picked up by plate side walls 18b and 34b and both springs 24 and 26 are now in a position to operate in parallel to carry load.

As previously indicated, the lengths of both springs are substantially equal and selected so that in their inactive or free state, they are in a slightly prestressed condition. The outer springs 24 are prestressed between the thrust receiving surfaces on cover end walls 14b and 28b and inner springs 26 between thrust receiving surfaces of plate projections 18c and 34c. Further, it will be noted that in this inactive state, as seen in FIG. 5, the opposed thrust receiving surfaces of cover side walls 14b and 28b and projections 18c and 34c are aligned and therefore spaced apart an equal distance. Since these are the engaging surfaces for the spring ends, both springs normally have their end portions aligned in the same plane. The distance between the thrust receiving surfaces of projections 18c and 34c and adjacent side walls 18b and 34b determine the amount of torsional play that will exist in the first torsional range. Accordingly, thrust surfaces of side walls 18b and 34b are spaced apart greater distance than the thrust surfaces of projections 18c and 34c in order to accomplish the desired result.

Illustrated in FIG. 10 is a torque vs. deflection graph depicting rigid disc which has no compression springs, a conventional 3° coaxial damper disc and the two-stage damper disc 10 of the present invention with various load modifications in the first stage. The various load conditions are accomplished by altering the number of plate openings 18a and 34a provided with projections 18c and 34c. In example No. 1, all eight plate openings 18a and 34a have projections. In No. 2, only four plate openings have projections. Example No. 2 has no projections with friction or hysteresis between the covers 28 and adjacent plates 18 and 34. In No. 4, all eight plate openings 18a and 34a were constructed without projections, i.e., identical to cover openings 28a.

From the foregoing, it will be apparent that the present invention has provided a two-stage coaxial spring damper that can easily be adapted to vary the rates of deflection between rotary clutch elements. A further advantage is that the present invention provides a two-stage damper which requires no additional space and therefore can be easily incorporated in an existing clutch for a worn or damaged disc. Additionally, the two-stage operation could be accomplished by resilient means in the form of one or more solid or tubular sleeve members and/or selecting members of greater or lesser stiffness to change the torque capacity of the clutch.

Having thus described a preferred embodiment of the invention, it should be understood that the invention is not to be limited to the specific construction and arrangement described. It will be apparent to those skilled in the art that modifications or alterations may be made without departing from the spirit and scope of the invention as set forth in the appended claims.

We claim:

1. A torque transmitting device comprising,
    a hub;
    a cover secured to said hub, said cover defining at least one opening having spaced side walls;
    a plate mounted on said hub for limited rotation relative to said hub and said cover, said plate defining at least one opening having spaced side walls, said plate opening adapted for alignment with said cover opening;

resilient means disposed in said aligned openings adapted to transmit a yieldable drive between said hub and said plate, said resilient means comprising a first resilient member and a second resilient member disposed in said first resilient member, each of said resilient members having end portions;

means on at least one of said plate or cover opening side walls for engaging one of said resilient members, at least one end portion of one of said resilient members spaced from said plate or cover opening side wall and engageable therewith upon limited relative rotation between said plate and said cover, and at least one end portion of the other of said resilient members engaging said plate or cover opening side wall engaging means.

2. A torque transmitting device according to claim 1 wherein said side wall engaging means includes an inwardly directed projection.

3. A torque transmitting device according to claim 2 wherein said side wall engaging means includes a second inwardly directed projection, and wherein said inwardly directed projections have spaced thrust surfaces, said spaced thrust surfaces and said cover opening side walls spaced apart an equal distance.

4. A torque transmitting device according to claim 3 wherein said plate opening side walls include thrust surfaces spaced apart a distance greater than the distance between said projection sidewall thrust surfaces and cover opening side walls.

5. A torque transmitting device according to claims 3 and 4 wherein said resilient members are coil springs having equal lengths.

6. A torque transmitting device according to claim 5 wherein said outer coil spring is held in tension between said cover side walls, and said inner coil spring is held in tension between said projection thrust surfaces.

7. A torque transmitting device according to claims 5 and 6 wherein said plate opening side walls are normally spaced from engagement with said outer coil spring end portions.

* * * * *